United States Patent [19]

Sanders

[11] 3,776,742

[45] Dec. 4, 1973

[54] NON-COCKLING CONDUCTIVE INK

[75] Inventor: Frederick W. Sanders, Chillicothe, Ohio

[73] Assignee: The Mead Corporation, Dayton, Ohio

[22] Filed: June 15, 1971

[21] Appl. No.: 153,426

Related U.S. Application Data

[63] Continuation-in-part of Ser. No. 800,261, Feb., 1869, abandoned.

[52] U.S. Cl. .............................. 106/22, 106/308 N
[51] Int. Cl.. C09d 11/00, C09d 11/02, C09d 11/16
[58] Field of Search ............................... 106/19–32

[56] References Cited
UNITED STATES PATENTS

| | | | |
|---|---|---|---|
| 3,705,043 | 12/1972 | Zubiak | 106/23 |
| 2,688,649 | 9/1954 | Bjorksten | 106/24 X |
| 3,513,000 | 5/1970 | Vrancken et al. | 106/24 X |
| 2,556,902 | 6/1951 | Chambers et al. | 106/24 X |
| 2,733,155 | 1/1956 | Williams et al. | 106/30 |
| 3,256,102 | 6/1966 | Arounowa | 106/22 X |
| 3,280,036 | 10/1966 | Howell | 106/22 X |
| 3,468,679 | 9/1969 | Furlotti | 106/22 |
| 3,486,912 | 10/1969 | Dyson | 106/31 X |
| 2,684,909 | 10/1954 | Leekley et al. | 106/24 |

OTHER PUBLICATIONS

Apps, Inks for the Minor Printing Processes and Specialized Applications, Vol. 3, published by Leonard Hill, London, 1963. Z 247 A7. Page 217 relied on.

Primary Examiner—Joseph L. Schofer
Assistant Examiner—J. B. Evans
Attorney—Marechal, Biebel, French & Bugg

[57] ABSTRACT

An electrically conductive aqueous base ink for use in printing on a cellulose containing base member by formation of discrete droplets to provide a non-cockled print is composed of a water soluble dye, a water soluble inorganic conductive material in an amount of between 1% to 20% and compatible with the dye, a water soluble polyol present in an amount between 5% to 50%, an organic crystallizable material which acts temporarily as a plasticizer for cellulose and present in an amount between 5% and 20%, and the balance water, the ink being substantially free of particulate material larger than about 1.5 mils in diameter.

8 Claims, No Drawings

NON-COCKLING CONDUCTIVE INK

RELATED APPLICATIONS

Cross-reference is made to U.S. application Ser. No. 768,790, filed Oct. 18, 1968 now U.S. Pat. No. 3,560,641, and assigned to the same assignee. This application is a continuation-in-part of U.S. application Ser. No. 800,261, filed Feb. 18, 1969 now abandoned, and assigned to the same assignee.

BACKGROUND OF THE INVENTION

This invention relates to printing inks and more particularly to an improved electrically conductive aqueous base ink for use in printing on paper and the like and which prevents cockling or buckling of the sheet.

A typical use of the ink of the present invention is in imaging systems wherein the intelligence is recorded by depositing fine droplets of ink in a predetermined pattern. In the case of high speed printing, discrete droplets of ink must be formed at the rate of between ten thousand and one million droplets per second, each possessing essentially the same color characteristics, for a given color. Usually, the drops range in size from 2 to 3 mil droplets to give deposited droplets of 3 to 5 mils in diameter, when generated through an orifice of between 1 to 1.5 mils in diameter, as described in the above application. Since formation of the information to be recorded, for example, characters, depends on deflecting some of the generated droplets from their normal trajectory, an electrical charge is used to deflect some of the droplets. Thus, the droplets must be capable of accepting a charge of considerable magnitude in a short time interval, and the conductivity of each of the discrete droplets must be such that they behave essentially the same under the influence of an electrical field of the same magnitude.

Due to the nature of the above system for recording information, i.e., the small size of the droplet and of the orifice, the solids content and the size of the solid particles in the ink must be controlled to prevent clogging of the generating orifice. Moreover, the ink must be available in many colors and must be visible, or capable of being treated to be visible. Printing with good definition also required droplets with controlled lateral spreading, penetration, or absorption to prevent bleed through which adversely alters the opposite side of the receiving member. The use of an aqueous ink eliminates high concentrations of highly toxic or flammable vapors such as found in the use of organic solvents, and these hazards are eliminated from the vicinity of the drop generating orifice or orifices.

Conventional aqueous base inks are known which are capable of being used in a system of the type above described, but suffer from the disadvantage of inordinately slow drying or of producing cockling or buckling of the member upon which the ink is deposited, particularly where paper or other cellulose containing member is used as the recording element. The problem of cockling is particularly noticeable where a substantial amount of ink is deposited.

DESCRIPTION OF THE PRIOR ART

It is known to provide aqueous base inks for facsimile systems in which the inks are formed into a vapor as opposed to droplets, and wherein the ink includes a dye, alcohol and glycerine, see U. S. Pat. No. 2,100,204 issued Nov. 23, 1937. The use of glycerine alone does not, however, eliminate cockling or puckering even though when initially deposted there is little visible cockling.

It is also known to provide inks which are electrically conductive in the sense that once deposited, the dried ink is relatively conductive. Such inks may not necessarily be conductive when in solution form. A typical such ink is described in U. S. Pat. 1,034,103 issued July 30, 1912. Conductive inks are also known for application to a ribbon, wherein the ink is formulated to permit transfer from the ribbon to paper by the pressure exerted through a type bar so as to provide a conductive character on paper, i.e., an ink which possesses post application conductivity. Such an ink is described in U. S. Pat. No. 2,265,419, issued Dec. 9, 1941, and includes conductive graphite particles, a filler such as bentonite or clay, a plasticizer such a glycerine, and ethyl alcohol. Not only does such an ink contain appreciable amounts of particulate solid matter, but the ink is not aqueous base in nature. The difficulty with an ink of such high particulate solids content is that of forming small droplets, and particularly droplets of uniform color density. If the amount of conductive particulate solid varies from one droplet to the next, a problem may exist in that the conductivity of the droplets may vary and thus provide a varying response to an electrical field.

U. S. Pat. No. 3,468, 679, issued Sept. 23, 1969, relates to an ink for ball point pens and the like wherein the ink has a viscosity of between 11,000 and 13,000 centipoises and which includes tannic acid as a thickening agent.

U. S. Pat. No. 3,280,036 issued Oct. 18, 1966, describes a particulate ink for use in electrostatic printing. The final ink product is a collection of solid particles of clay colored by a dye and sufficiently conductive to develop the pattern of charges on the printing media. In the preparation of the ink, water, glycerine, a dye and lithium chloride are mixed with clay to form a viscous paste which is then dried to form the particulate ink. The clay has a particle size distribution of 4% less than 20 micron, 8% greater than 74 microns, and 88% between 20 and 80 microns. Thus, a considerable portion of the clay is larger than about 38 microns in size.

SUMMARY OF THE INVENTION

By the present invention, an electrically conductive aqueous base ink is provided which is capable of being formed into droplets having essentially identical color characteristics, for any given color, little if any particulate solid matter, and having electrical properties such that each droplet at the same mass behaves the same in an electrical field of the same magnitude. It is for this reason that the ink of the present invention is substantially free of particulate material larger than about 1.5 mils, i.e., a drop is formed through a small generating orifice and each drop should have the ability to respond in the same manner in an electrical field. Thus, the amount of particulate material is maintained at a minimum, and if present, the particles should not be larger than about 1.5 mils. Accordingly, the conductive ink includes water, a water soluble dye, a water soluble inorganic conductive material compatible with the dye, a water soluble polyol and an organic crystallizable material which acts temporarily as a plasticizer for cellulose. Such an ink, containing little, if any, particulate matter, may be used to form patterns of recorded information on a paper base member while eliminating cockling or buckling which is produced by some of the commonly available aqueous base inks.

Thus, in accordance with the present invention, an aqueous base ink is used which includes between 0.1% and 5% of a water soluble dye, between 1% and 20% of a water soluble inorganic conductive material, preferably a salt, the salt operating to impart electrical conductivity to the ink and some anti-cockling quality, and a polyol present in an amount between 5% and 50% and imparting anti-cockling properties to the ink. It has been found that the combination of a water soluble salt together with a polyol provides better anti-cockling properties than either material alone. Also present in an amount between 5% and 20% is the organic water soluble crystallizable material previously mentioned which has a synergistic effect with the salt insofar as anti-cockling properties are concerned.

The ink of the present invention, when deposited on a cellulose containing base member, is substantially permanently adhered thereto while providing a non-cockled or smooth, non-puckered printed sheet even though a considerable quantity of ink is deposited on the base or recording member.

Accordingly, it is an object of the present invention to provide an aqueous base ink for use in printing to product a non-cockled print.

Another object of the present invention is the provision of an electrically conducting aqueous base ink capable of being formed into discrete droplets which, when deposited on a cellulose containing base member, provides a non-cockled print.

Another object of the present invention is the provision of a non-flammable aqueous base ink capable of being formed into droplets and responsive to an electrical field for controlled deposition on a cellulose containing base member to provide a non-cockled, non-buckling print.

Other objects and advantages of the invention will be apparent from the following description and the appended claims.

DESCRIPTION OF THE PREFERRED EMBODIMENTS

In accordance with the present invention, an electrically conductive aqueous base ink is provided which includes the following ingredients:

1. A water soluble dye;
2. A polyol;
3. An inorganic water soluble conductive material;
4. An organic aqueous soluble crystallizable material; and
5. Water Various water soluble dyes may be used depending upon the particular color desired, the dye being present in an amount by weight of 0.1% and 5%. Typical dyes which have been used are:

| | |
|---|---|
| Green | Acid Green L Extra Con. 200%; |
| Red | Eosin OJ, Eosin D, Eosin C Red 22; Sulfo Rhodamine B, Calcozine Red 6G; |
| Blue | Cyanine Blue B, Non-Bleed Turquoise ZIP Blend, Turquoise 20-2335; |
| Yellow | Tartrazine Conc., Napthol Yellow S, Orange G; |
| Black | Glycolan Black WAL, Direct Black EAFS, Irgalan Black, Drimarene Black Z-BL; |
| Magenta | Phloxine B, Rhodamine B; |
| Scarlet | Drimarene Scarlet Z-GL |

The dyes may be used in combination, to produce tints and shades as is well known in the art.

The polyol is present in an amount by weight of between 5% and 50% and may be any one of ethylene glycol, glycerol, diethylene glycol and triethylene glycol. The polyol alone exhibits some anti-cockle effect, to the extent that there was no noticeable cockling when the ink was deposited, and the sheet seemed to flatten after the ink dried. In a few days, however, the image area had puckered or cockled to the extent that it was visible on both sides of the paper. Monohydric alcohols did not seem to cure the cockle problem, but created new problems, such as penetration and lateral spreading of the inks.

Various water soluble conductive materials also exhibit an anti-cockle effect but in amounts above about 20% by weight operated to increase the viscosity of the ink substantially or cause precipitation of some of the dyes. In an amount between about 1% and 20%, and in combination with a polyol, both the conductive material and polyol showed better anti-cockle properties than either the conductive material or the polyol alone. Usable in accordance with the present invention as conductive materials having anti-cockling properties are the chlorides of zinc, aluminum, calcium, magnesium, potassium, strontium, manganese, copper, nickel, sodium and cobalt. Also usable is calcium nitrate, potassium nitrate, sodium nitrate, alone or in combination with the chloride salts. Boric acid may also be used and offers the advantage of compatibility with various dyes.

The use of a salt or boric acid in combination with a polyol tended to produce a limp sheet, which is not entirely objectionable. In instances where this is objectionable, it may be overcome in accordance with the present invention by the use of between 5% and 20% of an aqueous soluble organic crystallizable material, compatible with the polyol, and which is believed to act temporarily as a plasticizer for cellulose and which, in combination with the salt or acid and polyol, enhances the anti-cockling properties of the ink. The crystallizable material provided some stiffness to the sheet. Typical such materials are urea, propylene urea, thiourea, ethylene urea, acteamide, sugars such as glucose, sucrose, fructose and the like, thiocyanates. Of the above materials, urea also yielded additional anti-cockle effect.

Washability of the ink, that is, resistance to removal by water can be improved without impairing the stability of the wetting by incorporating into the composition an excess of 7% or more, by weight, of a crosslinking aldehyde such as formaldehyde or glyoxal, based on the total weight of the composition. When present in excess, as indicated, the urea, propylene urea, ethylene urea or thiourea reacts with the excess aldehyde to form a condensation polymer under acid conditions, e.g., in the presence of an active hydrogen. The active hydrogen may come from the sugars, cellulose or any other source of active hydrogen, e.g., the dye. As water is evaporated, the crosslinking starts and any excess aldehyde is also evaporated. While this form of a composition exhibits a tendency to cause curl (as distinguished from cockle) to the printed side of the sheet, the composition is useful in printing on fabrics and can also be used to print on both sides of a paper sheet thus balancing the curl.

The balance of the ink in accordance with the present invention is water which has been distilled to assure removal of substantially any dissolved material which might react with the other components of the ink resulting in formation of a precipitate or which might affect the stability of the ink. As will be understood by those skilled in the art, distilled water is not essential provided the available supply is free of materials which cause stability or precipitation problems.

Since the ink may be used under widely varying conditions of relative humidity, the rate of evaporation of the ink varies accordingly. At relatively low humidity, i.e., dry days or climatic conditions, the ink may evaporate quite quickly causing build up which might possibly interfere with the deposition process. In accordance with the present invention, this problem is overcome by the addition of between 1% and 3% by weight of 1, 2, 6, hexanetriol, with 2% being usable for most conditions of relative humidity.

It has also been observed in accordance with the present invention that the ink exhibits some corrosion toward certain metals, for example, 316 stainless steel, nickel and the like. While the corrosion is not severe in the sense that the metals are consumed or etched, e.g., as pickling solution affects stainless steel, there does appear to be a build up or deposit formed in small but sufficient quantities to cause problems of flow of ink or formation or deflection of droplets. Thus, in accordance with the present invention, glucono d-lactone is added to inhibit reaction with stainless steels, and calcium nitrate may be used as the salt to inhibit reaction with nickel.

In accordance with the present invention, the surface tension of the ink is controlled since rheology and ability to form droplets are important. To provide an ink which does not spread and which has minimum foaming, the surface tension of the ink is between 35 and 70 dynes per centimeter. Below about 35 dynes per centimeter, the ink spreads and exhibits a tendency to penetrate the sheet, and in some types of printing this may be desirable. Of the materials mentioned, calcium chloride, in combination with the polyol and urea or its derivatives provides an ink having a surface tension in the high end of the range. Reduction of surface tension may be accomplished by adding alcohol, tetraethylene glycol, or the like, to the ink.

The preferred pH range is between 8.5 and 3.0. Above about 8.5 the ink tends to spread and penetrate the paper. Below pH of about 3.0 the cellulose tends to degrade rapidly.

In addition to the above materials, the inks may have added to them materials for varying such properties as surface tension, solvating power for the dyes or salts, flexibility of the dried ink, color, solvent resistance and the like. Materials which may be used as additions are water soluble, active hydroxyl containing groups such as polyols, sugars, phenolics, amines, carboxyl alcohols, which may be used in place of part of the polyols.

The following are offered as examples of inks of the present invention and are not to be construed as a limitation thereon:

EXAMPLE 1

| | | |
|---|---|---|
| Dye | Sulfo Rhodamine B (Red Color) | 0.25% |
| Salt | Calcium Chloride | 5% |
| Polyol | Ethylene Glycol | 10% |
| Organic crystallizable material | Ethylene urea | 10% |
| Water — balance | | |

EXAMPLE 1a

The composition of Example 1 was used and had added to it an excess of 8% by weight, based on the total weight of the composition of formaldehyde. This provided a liquid ink from an aqueous system which, in addition to the properties described, also exhibited resistance to removal by water when dried.

EXAMPLE 2

The same ingredients as set forth in Example 1 were used except that calcium nitrate was used in place of calcium chloride, and the pH was adjusted to about 4 with sulfamic acid.

EXAMPLE 3

The same ingredients as set forth in Example 1 were used except that the amount of calcium chloride was increased to 10%.

EXAMPLE 4

| | |
|---|---|
| Calcium chloride | 5% |
| Ethylene Glycol | 10% |
| Urea | 10% |
| Water | 75% |

The above formed the basic mixture to which various amounts of dyes and additives were added as set forth in the following examples. To provide a black ink, 3.5% by weight of Drimarene Z Bl dye was added, and 0.1% glucono d-lactone was added for anti-corrosion effect. The ink had a surface tension of 37.8 dynes per centimeter.

EXAMPLE 4a

The composition of Example 4 was modified to include an excess of 9% by weight of the total composition of glyoxal for the purpose of improving washability.

EXAMPLE 5

The basic mixture of Example 4 was used with glucono d-lactone added in the amount specified to provide a blue ink, 3% by weight of Turquoise 20-2335 was added to the basic mixture. This ink had a surface tension of 40 dynes per centimeter.

EXAMPLE 6

The basic mixture of Example 4 was used with glucono d-lactone added in the amount specified. Scarlet ink was provided by adding 1% by weight of Drimarene Scarlet Z-GL. This ink has a surface tension of 52.5 dynes per centimeter.

EXAMPLE 7

The basic mixture of Example 4 was used with glucono d-lactone added in the amount specified. To provide a yellow ink, 0.5% of Tartrazine dye was added. The surface tension of this ink was 57.4 dynes per centimeter.

EXAMPLE 8

The materials set forth in Example 7 were used in the amount specified except that the Tartrazine dye was increased to 1%. The surface tension was similar to that of the ink described in Example 7.

EXAMPLE 9

The basic mixture of Example 4 was used with glucono d-lactone added in the amount specified. A cyan colored ink was provided by the addition of 3% of Turquoise 20-2335 dye. The surface tension of this ink was similar to that of Example 5.

EXAMPLE 10

Water — 75%
Ethylene Glycol — 9%
Urea — 10%
Calcium Chloride — 4%
1, 2, 6 Hexanetriol — 2%

To the above material was added 3.5% Phloxine B to provide a magenta colored ink having a surface tension of 54.5 dynes per centimeter. A magenta ink was also produced by substituting Rhodamine B dye for the Phloxine B.

EXAMPLE 10a

The composition of Example 10 was modified to include an excess of 10% by weight of the total composition of formaldehyde to provide washability.

EXAMPLE 11

A black ink was made using the ingredients set forth in Example 10 with the exception of the addition of 0.01% glucono d-lactone and 3.5% Drimarene Z Black BL dye in the place of the Phloxine B dye. This black ink had a surface tension of 37.5 dynes per centimeter.

In the preparation of the inks, the water and the polyol were mixed together followed by the addition of the organic crystallizable material. After the latter was dissolved, the salt was added and dissolved. If the triol was used, it was added at this point in the sequence. Next, the dye is added with mixing for varying times, particularly with Drimarene Black, Phloxine B and Rhodamine B, since these dyes may take an hour or longer to dissolve. If used in the formulation, the glucono d-lactone is added last as a 10% solution in water. To eliminate any solids which may have formed, the ink was filtered through a No. 4 Whatman filter paper followed by a glass pre-filter and then a 3 micron Millipore filter. The ink may now be bottled and stored for use as needed.

The ink of the present invention offers the advantages previously noted and the absence of substantial amounts of particulate materials which might tend to clog the small generating orifices used in forming the droplets. Images produced with the ink of the present invention were sharp in definition and showed little penetration or lateral spreading. Most important, however, was the absence of any noticeable cockling or buckling of the sheet. The sheets remained essentially buckle free much in the same fashion as conventionally printed sheets.

While the product herein described constitutes a preferred embodiment of the invention, it is to be understood that the invention is not limited to this precise product, and that changes may be made therein without departing from the scope of the invention.

What is claimed is:

1. An aqueous base conductive ink, substantially free of particulate material larger than about 1.5 mils and having a surface tension of between 35 and 70 dynes per centimeter, for use in high speed printing on a cellulose containing base member by formation of discrete droplets of ink with a drop generating orifice and for prevention of cockling of said member, consisting essentially of:
   a water soluble dye present in an amount by weight of between 0.1% and 5% of the total weight of said ink;
   a water soluble electrically conductive inorganic material compatible with said dye and present in an amount by weight of between 1 and 20% of the total weight of said ink;
   said conductive material being selected from the group consisting of the chlorides of zinc, calcium, aluminum, magnesium, potassium, strontium, manganese, copper, nickel, sodium, and cobalt, calcium nitrate, boric acid, potassium nitrate, sodium nitrate, and mixtures thereof;
   a water soluble low molecular weight polyol present in an amount by weight of between 5% and 50% of the total weight of said ink,
   said water soluble polyol being selected from the group consisting of ethylene glycol, glycerol, diethylene glycol and triethylene glycol;
   a water soluble crystallizable organic material compatible with the polyol and temporarily having plasticizing properties for cellulose and present in an amount by weight of between 5% and 20% of the total weight of said ink,
   said crystallizable organic material being selected from the group consisting of urea, thiourea, acetamide, thiocyanates, glucose, sucrose, fructose, ethylene urea, and propylene urea; and the balance water.

2. An aqueous base ink as set forth in claim 1 wherein said conductive material is sodium chloride and further including a minor amount of glucono d-lactone.

3. An aqueous base ink as set forth in claim 1 which includes an excess of 7% or greater, by weight of total composition of an aldehyde selected from the group consisting of formaldehyde and glyoxal, said aldehyde being cross-linkable with any of said urea, thiourea, ethylene urea and propylene urea, to provide an ink, which when dried, is resistant to washing by water.

4. An aqueous base ink as set forth in claim 1 wherein said conductive material is calcium chloride and present in an amount between 5% and 20%, said polyol being glycol and present in an amount between 5% and 10%, and said crystallizable material being urea and present in an amount between 5% and 15%.

5. An aqueous base ink as set forth in claim 1 further including 0.1% by weight of glucono d-lactone.

6. An aqueous base ink as set forth in claim 1 further including 2% by weight of 1, 2, 6 hexanetriol.

7. An aqueous base ink as set forth in claim 1 wherein said conductive material is present in an amount of 5% to 10% and is selected from the group consisting of calcium chloride and calcium nitrate, said polyol being ethylene glycol present in an amount between 5% and 15%, said crystallizable material being ethylene urea present in an amount by weight of between 5% and 15%, and said ink having a pH in the range of 3 to 8.5.

8. An aqueous base ink as set forth in claim 4 wherein the amount of calcium chloride is 5%, the amount of ethylene glycol is 10% and the amount of urea is 10%.

* * * * *